US010859186B2

(12) United States Patent
Angus

(10) Patent No.: US 10,859,186 B2
(45) Date of Patent: Dec. 8, 2020

(54) HOSE HANGER

(71) Applicant: Watts Regulator Co., North Andover, MA (US)

(72) Inventor: Michael T. Angus, Derry, PA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 15/872,492

(22) Filed: Jan. 16, 2018

(65) Prior Publication Data

US 2019/0219197 A1 Jul. 18, 2019

(51) Int. Cl.
*F16L 3/00* (2006.01)
*F16L 3/12* (2006.01)
*F24C 3/00* (2006.01)
*F16L 57/00* (2006.01)

(52) U.S. Cl.
CPC ............ *F16L 3/003* (2013.01); *F16L 3/1215* (2013.01); *F16L 57/005* (2013.01); *F24C 3/00* (2013.01); *F16L 2201/80* (2013.01)

(58) Field of Classification Search
CPC ....... F16L 3/003; F16L 3/1218; F16L 3/1215; F16L 57/005; F16L 2201/80; F24C 3/00
USPC ............ 248/76, 78, 77, 82, 75; 285/61, 901, 285/134.1, 135.1, 135.2, 135.3, 135.4, 285/135.5, 12, 317
See application file for complete search history.

(56) References Cited

U.S. PATENT DOCUMENTS

| | | | |
|---|---|---|---|
| 471,156 A * | 3/1892 | Tinsley | B05B 15/625 248/82 |
| 493,719 A * | 3/1893 | Henderson | F16L 3/003 248/75 |
| 742,855 A * | 11/1903 | Garrett | |
| 831,713 A * | 9/1906 | Ferguson | B67D 1/16 137/313 |
| 1,050,615 A * | 1/1913 | Coates | F16L 37/48 285/8 |
| 1,189,970 A * | 7/1916 | Kline | F16L 3/003 211/119.011 |
| 1,249,918 A * | 12/1917 | Dinsmoor | B05B 15/622 239/276 |
| 1,325,147 A * | 12/1919 | Donnelly | F16L 41/03 285/125.1 |
| 1,519,018 A * | 12/1924 | Boudreau | B65H 75/28 24/279 |
| 1,816,301 A * | 7/1931 | Sundell | F16B 2/245 24/339 |
| 3,180,599 A * | 4/1965 | Nestor | F16K 31/60 248/75 |
| 4,266,813 A * | 5/1981 | Oliver | F16L 25/14 285/12 |
| 4,300,597 A | 11/1981 | Delay | |

(Continued)

*Primary Examiner* — Kimberly T Wood
(74) *Attorney, Agent, or Firm* — Burns & Levinson, LLP; George N. Chaclas; Joseph P. Quinn

(57) ABSTRACT

The disclosed hose hanger apparatus is manually installable on a gas supply hose to secure and retain an end of the gas supply hose when the hose is disconnected from a gas appliance. The hose hanger apparatus is configured to engage with and protect a quick disconnect female coupler installed on the end of the gas supply hose. The hose hanger apparatus is also configured to engage with and accept a male quick disconnect nipple when installed in an opposite orientation on the gas supply hose.

10 Claims, 9 Drawing Sheets

(56) References Cited

U.S. PATENT DOCUMENTS

| | | | | | |
|---|---|---|---|---|---|
| 4,484,769 | A | * | 11/1984 | Lacey | A61M 39/12 285/110 |
| 4,613,112 | A | * | 9/1986 | Phlipot | F16L 37/22 137/71 |
| 4,706,834 | A | | 11/1987 | Farney et al. | |
| 5,178,422 | A | * | 1/1993 | Sekerchak | F16L 27/08 126/38 |
| 5,472,025 | A | * | 12/1995 | Conrad | B65B 39/007 141/331 |
| 6,068,020 | A | * | 5/2000 | Sammons | F16K 35/06 137/377 |
| 8,317,149 | B2 | * | 11/2012 | Greenburg | A61B 1/00128 248/228.7 |
| 8,522,394 | B2 | * | 9/2013 | Lee | A47L 9/0036 15/323 |
| 8,584,968 | B2 | * | 11/2013 | Nelson | F16L 3/18 239/162 |
| 2008/0287919 | A1 | * | 11/2008 | Kimball | A61M 25/1011 604/533 |
| 2018/0045409 | A1 | * | 2/2018 | Jenkins | A61M 5/3243 |
| 2018/0239370 | A1 | * | 8/2018 | Perry, Jr. | G05D 7/0133 |

* cited by examiner

HOSE HANGER

FIELD OF TECHNOLOGY

Aspects of the present disclosure are in the field of gas line couplers and more particularly in the field of apparatus for retaining and protecting quick disconnect couplings on gas supply hoses.

BACKGROUND

Quick disconnect hose couplings are very well known and commonly used fittings for terminating detachable fluid conduits. A quick disconnect hose coupling is a coupling used to provide a fast, make-or-break connection of fluid transfer hoses such as gas hoses and liquid hoses for example.

Advantageously, quick disconnect fittings are operated by hand and can replace threaded or flanged connections, which require wrenches to install. Although the term "quick disconnect" is used throughout the present disclosure, it should be understood that the term "quick connect" is also commonly used as an alternative name describing the same fittings.

SUMMARY

Aspects of the present disclosure include a hose hanger apparatus that attaches directly to a gas supply hose. In an illustrative embodiment, the apparatus may be secured to the gas supply hose without tools using a fastener such as a hand screw or wing nut, for example. When the quick disconnect female coupler is disconnected from a gas appliance, the quick disconnect female coupler snaps into the hose hanger apparatus which protects the quick disconnect and keeps the gas supply hose securely off the floor during the cleaning process. The hose hanger apparatus can also be mounted in 180 degree opposite orientation for engagement with the quick disconnect male coupler or nipple for those install configurations where the gas supply hose is disconnected from a wall gas manifold.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION

Figure 1A:
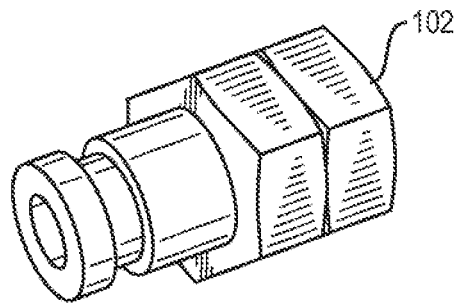
FIG. 1A is an illustration of a male quick disconnect nipple.

The subject technology overcomes many of the prior art problems associated with handling quick connect hoses. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements.

Aspects of the present disclosure include an apparatus and method for protecting quick connect fittings that are installed on a gas supply hose when the gas supply hose is temporarily disconnected from a gas supply line.

Figure 1B:
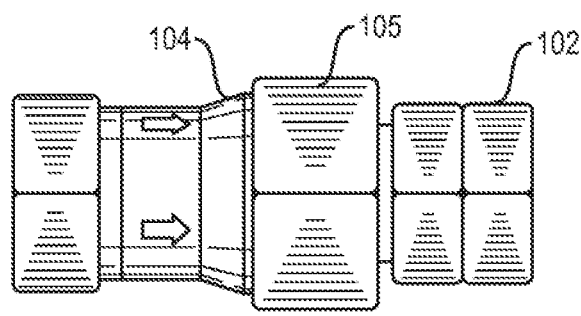
FIG. 1B is an illustration of a quick disconnect female coupler engaged with a male quick disconnect nipple.

Quick connect couplings are standardly used in a wide variety of plumbing, heating, electrical and fire suppression systems, for example. Referring to FIGS. 1A and 1B, a standard prior art quick disconnect hose coupling generally includes a quick disconnect male nipple 102 that snaps into a mating standard sleeve-lock type quick disconnect female coupler 104. One or both of the quick disconnect male nipple 102 or the quick disconnect female coupler 104 may terminate an end of a gas hose, or gas supply line. When disconnected, fluid flow from the supply is preferably blocked. To disconnect the male nipple 102 from the female coupler 104, a sleeve 105 on the female coupler is manually retracted to unlock the male nipple 102 from the female coupler 104.

Figure 2:
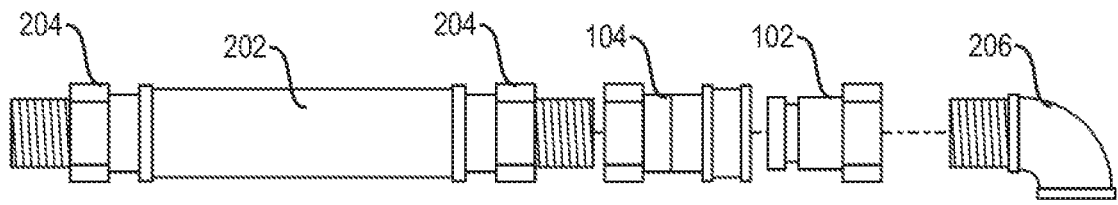
FIG. 2 is an exploded view of a gas hose system including a gas hose, quick disconnect female receptacle, a male quick disconnect nipple and a threaded elbow.

As shown in FIG. 2, a gas hose 202 is conventionally terminated with threaded fittings 204, which are permanently coupled to the gas hose 202. A quick disconnect female coupler 104 may be coupled to the gas hose 202 by mating with the threaded fitting 204. A gas supply line is conventionally configured with a threaded outlet port such as a threaded elbow 206. A quick disconnect male nipple 102 may be coupled to gas supply line by mating with the thread elbow 206. The gas hose 202 may then be quickly connected and disconnected to the gas supply line by coupling or decoupling the quick disconnect male nipple 102 with the quick disconnect female coupler 104. It should be understood that the items described and shown in FIG. 2 may also arranged in an alternative configuration in which the quick disconnect male nipple 102 may be threaded onto the threaded fitting 204, and the quick disconnect female coupler may be threaded onto the threaded elbow 206, for example.

Quick disconnect fittings offer a significant time saving benefit over other coupling hardware and require little skill for their usage. Moreover, some quick disconnect fittings include additional safety features such as built-in automatic shut off valves that prevent the flow of gas through the quick disconnect fitting when decoupled from a mating quick disconnect fitting. There are a large variety of quick connect fittings in the market, which are applicable to many industries.

Figure 3:
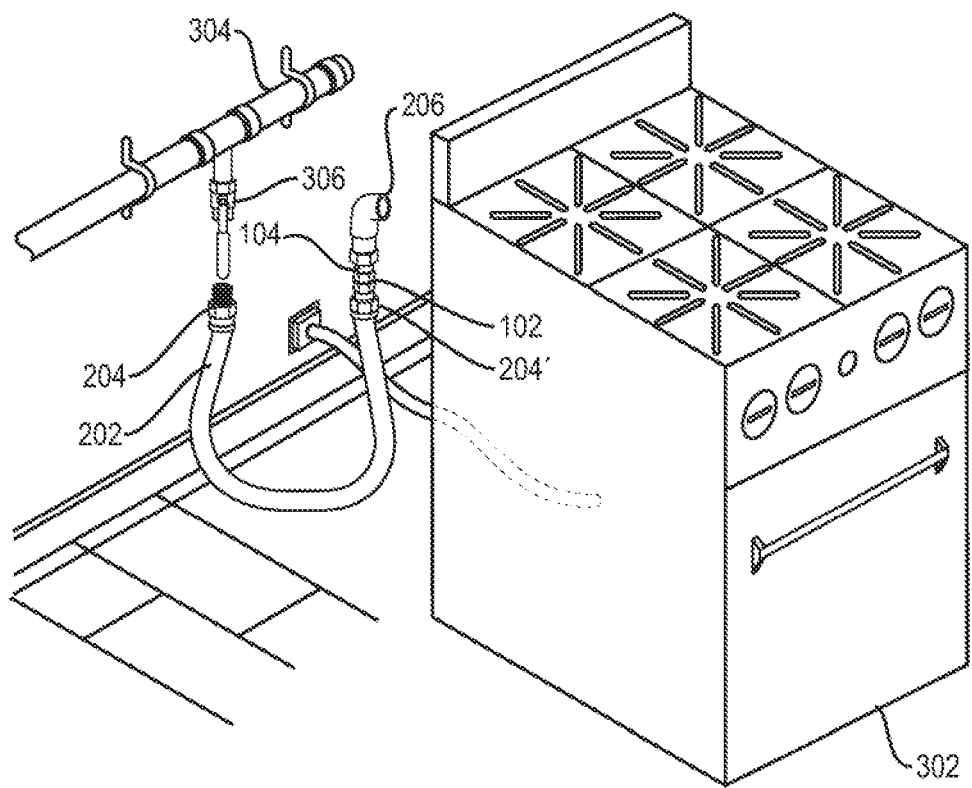
FIG. 3 is an illustration of a typical gas hose configuration for supplying gas to a gas appliance.

In an example implementation, a quick disconnect female coupler may be used to couple a gas hose to a gas appliance such as a kitchen stove or gas range. Referring to FIG. 3, a gas appliance 302 is coupled to a gas supply line 304 by a gas hose 202. The gas hose 202 may be permanently coupled to the gas supply line, for example by coupling a threaded fitting 204 on one end of the gas hose 202 with a mating threaded port on a gas shut of valve 306 which is coupled to the gas supply line 304. A quick connect male coupler 102 is threaded onto a second threaded fitting 204' on the other end of the gas hose 202. A quick disconnect female coupler 104 is threaded into a threaded elbow 206 which is coupled to gas port 308 of the gas appliance 302. In this configuration, the gas hose 202 may be easily connected and disconnected to/from the gas appliance 302 by coupling or decoupling the quick disconnect male fitting 102 to/from the quick disconnect female coupler 102.

In an alternative configuration, the gas hose 202 may be permanently coupled to the gas appliance 302 by threading the threaded fitting 204' on one end of the gas hose 202 to the gas port 308 or threaded elbow 206. In this configuration, a quick disconnect male nipple 102 is threaded to the threaded fitting 204 on the other end of the gas hose 202. A quick disconnect female coupler 104 may be threaded to the gas supply line 304 or gas shut off valve 306. The gas hose 202 may be easily connected to/from the gas supply line 304 or gas shut off valve 306 by coupling or decoupling the quick disconnect male fitting 102 to/from the quick disconnect female coupler 102. This configuration may be preferred for implementations in which the quick disconnect female coupler 102 includes a built in fuel shut off valve, for example, which should be permanently coupled to the gas supply line.

In the example implementation, when the quick disconnect male nipple 102 is disconnected from the quick disconnect female coupler 104, the gas hose 202 may be allowed to hang from a permanently connected end onto a floor, for example. A disconnected gas hose 202 that is not properly retained or quick connect fittings 102, 104 that are not protected can be vulnerable to damage or contamination especially when the gas hose 202 is allowed to rest on a floor while the gas appliance 302 is cleaned. Accordingly, when a gas hose 202 for supplying gas to a gas appliance 302 such as kitchen stove or range is disconnected to maintain or clean the appliance, it is desirable to protect the quick disconnect fittings 102, 104 that terminate the gas supply hose 202 and to prevent the disconnected gas hose 202 from resting on the floor.

Some manufacturers of gas fittings such as quick disconnect female couplers and quick disconnect male nipples provide protective sleeves to cover exposed portions of the fittings. However, the protective sleeves provided by the manufacturers are generally not robust enough to properly secure and protect quick disconnect fittings on supply hoses when the hoses are disconnected from an appliance for cleaning, for example.

Figure 4A:
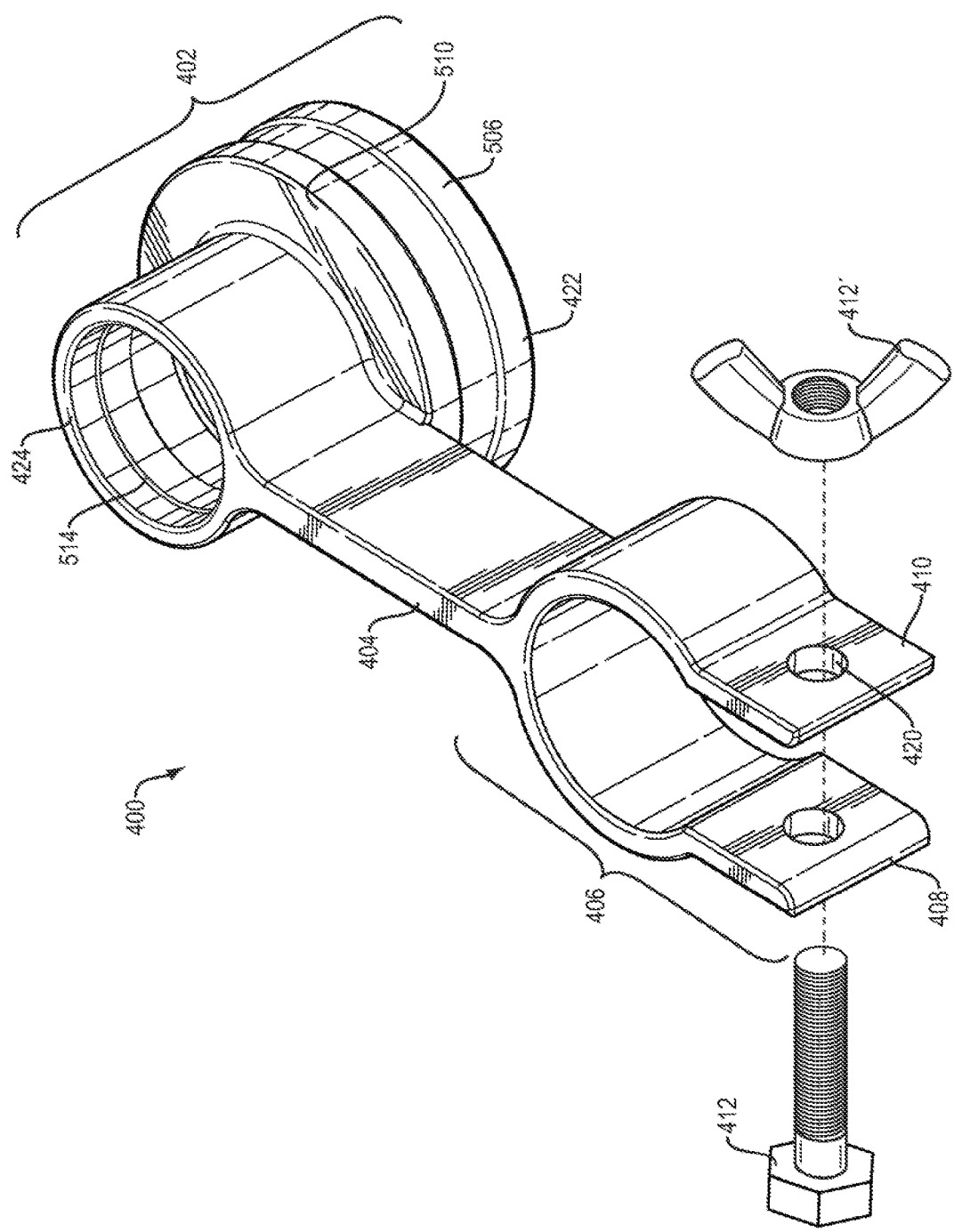
FIGS. 4A-C are perspective illustrations of a hose retaining apparatus according to an aspect of the present disclosure.
Figure 4B:
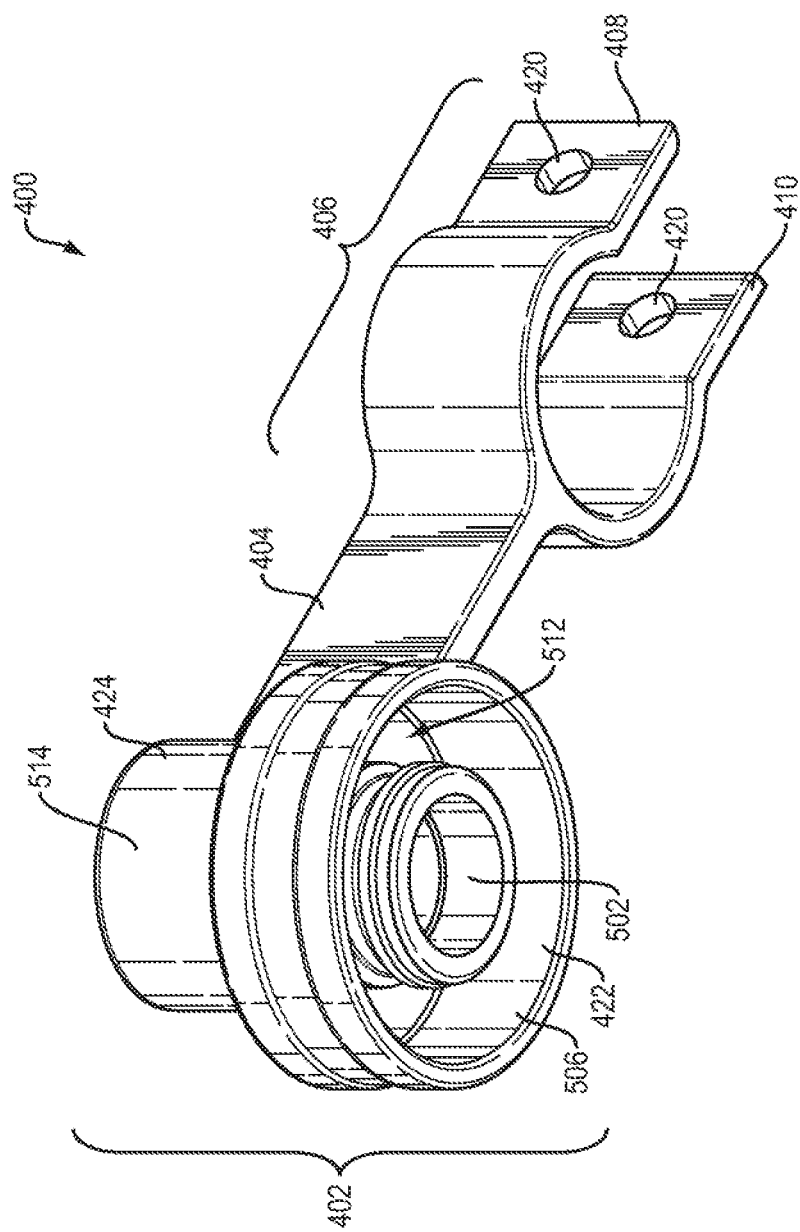
Figure 4C:
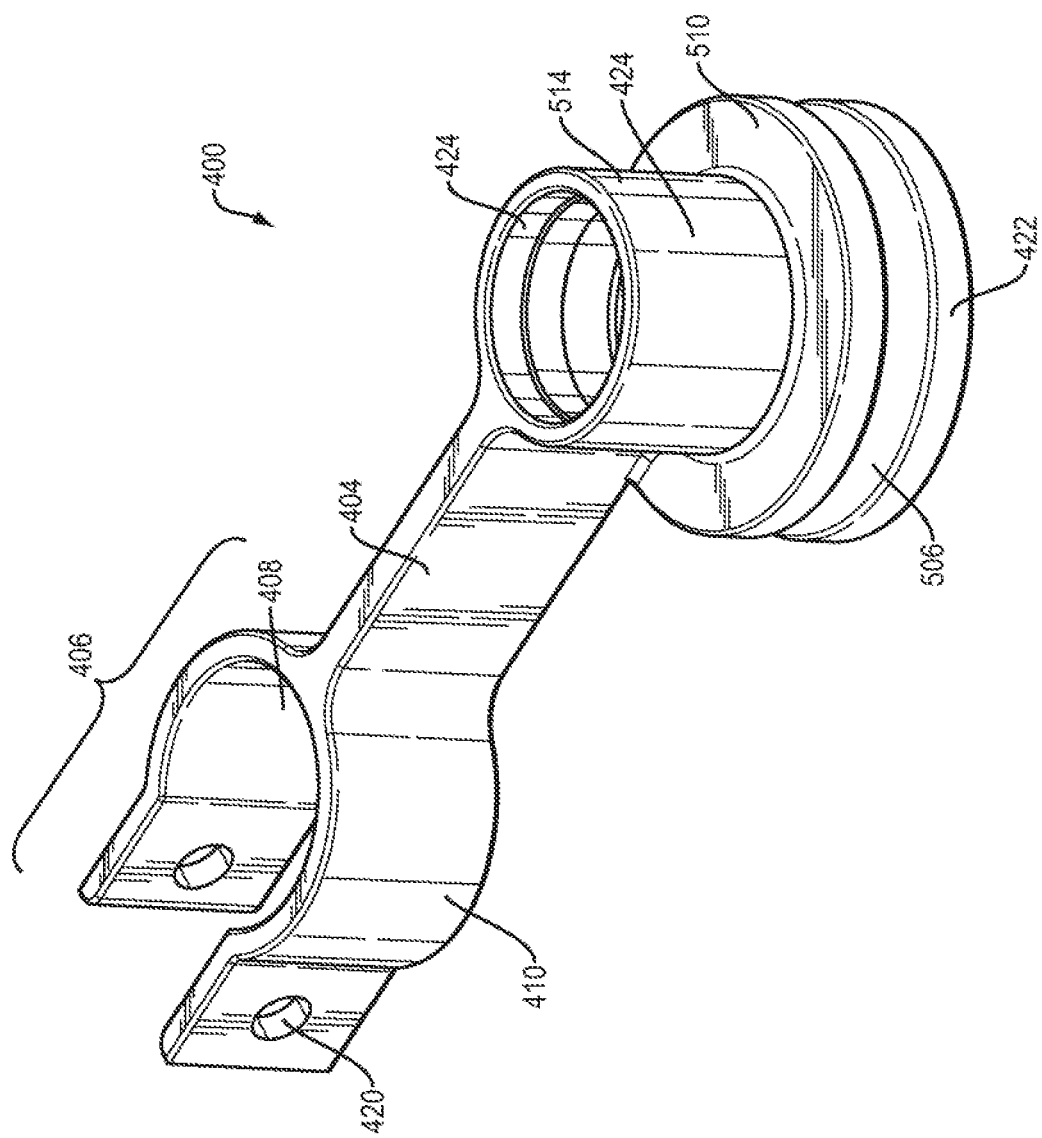

An aspect of the present disclosure includes a hose retaining apparatus that retains a disconnected gas hose and protects a quick disconnect fitting that is installed on the hose. Referring to FIGS. 4A-C, the hose retaining apparatus 400 includes a hose end receptacle portion 402, a central arm 404 extending radially from the hose end receptacle portion 402 and at least one flexible arm portion 406 extending from the central arm 404 opposite the hose end receptacle portion 402. According to an aspect of the present disclosure, the hose end receptacle portion 402 is configured to receive and removably engage with female and male quick disconnect hose fittings. The flexible arm portion 406 is configured to clamp around a hose that is terminated by the quick disconnect hose fitting.

In an illustrative embodiment, as shown in FIGS. 4A-C, the hose end receptacle portion 402 has a double collar portion 422 configured for snap engagement with a quick disconnect female coupler 104 and a single collar portion 424 for engagement with a quick disconnect a male nipple 102. According to another aspect of the present disclosure, in an illustrative embodiment the hose end receptacle portion 402 may only configured for snap engagement with a male quick disconnect nipple 102 or a quick disconnect female coupler 104.

In an illustrative embodiment, the flexible arm portion 406 includes a first flexible arm 408 and a second flexible arm 410 opposite the first flexible arm 408. The first flexible arm 408 and the second flexible arm 410 are configured to clamp around a hose such as a gas hose 202.

A fastener assembly 412, such as a screw and/or wing nut, is configured to urge the first flexible arm 408 toward the second flexible arm 410 for removably fastening the apparatus 400 to a hose.

In an alternative embodiment, the flexible arm portion 406 may include a single arm configured to wraps around the gas hose 202. In this embodiment, the fastener 412 may be configured to fasten an end of the flexible arm portion 406 to the central arm 404 for removably fastening the apparatus 400 to the gas hose 202.

Figure 5:
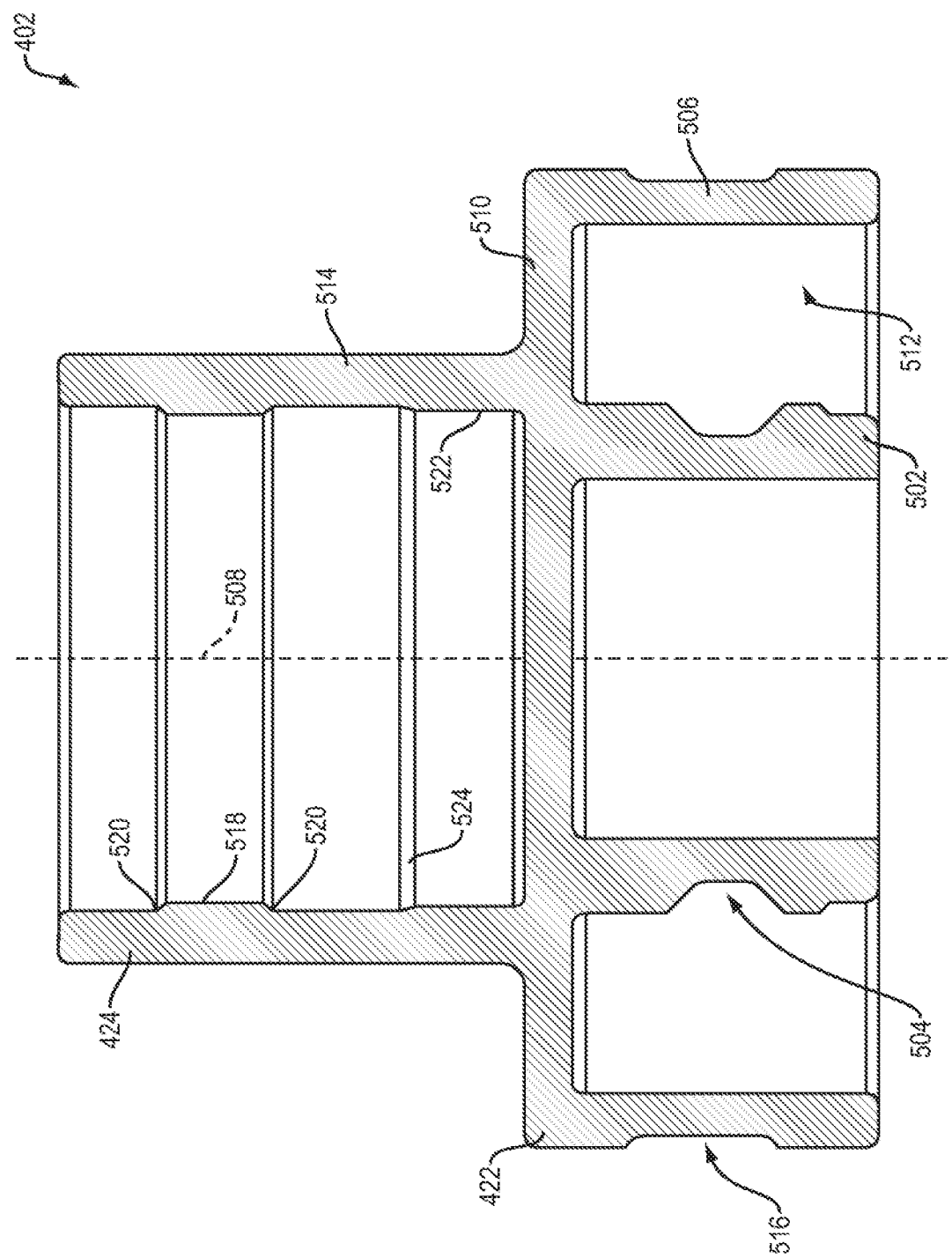
FIG. 5 is a cross sectional view of a hose end receptacle portion of a hose retaining apparatus according to an aspect of the present disclosure.

Referring to FIG. 5, a cross section view of the hose end receptacle portion 402 is shown. The double collar portion 422 includes a first cylindrical wall 502 having an external annular groove 504. The external annular groove 504 is configured to accept an internal annular rib of a quick disconnect female coupler 104. In an illustrative embodiment, the first cylindrical wall 502 includes an outside profile that is substantially similar to an outside profile of a male quick disconnect nipple 102, for example.

A second cylindrical wall 506 is coaxially arranged outside of the first cylindrical wall 502 about a central axis 508 of the hose end receptacle portion. The second cylindrical wall 506 forms circumferential skirt portion of the hose end receptacle portion 402. The second cylindrical wall 506 also has an outer indentation 516 for facilitating manual grip by a user.

The first cylindrical wall 502 and second cylindrical wall 506 extend from a disk portion 510. The first cylindrical wall 502, the second cylindrical wall 506 and the disk portion 510 define an annular grove 512 for receiving and protecting the quick disconnect female receptacle 104. The disk portion 510 forms a first cover surface configured for closing the quick disconnect female receptacle.

According to another aspect of the present disclosure, the single collar portion 424 of the hose end receptacle portion 402 is further configured for snap engagement with a male quick disconnect nipple 102. In an illustrative embodiment, the single collar portion 424 includes a third cylindrical wall 514 extending from the disk portion 510 opposite the first cylindrical wall 502 and the second cylindrical wall 506. The third cylindrical wall 514 is coaxial with the first cylindrical wall 502 and the second cylindrical wall 506. In an illustrative embodiment, the third cylindrical wall 514 includes an inside profile that is substantially similar to an inside profile of a quick disconnect female receptacle 104, for example. The disk portion 510 forms a second cover surface configured for closing the male quick disconnect nipple 102. The third cylindrical wall 514 has an inner ridge 518 for snap-fit engagement with a complimentarily shaped male nipple. For ease of connection and disconnection, the inner ridge 518 has chamfered portions 520. A thick base portion 522 may also have a chamfered portion 524 to still more effectively couple to the male nipple.

Figure 6:
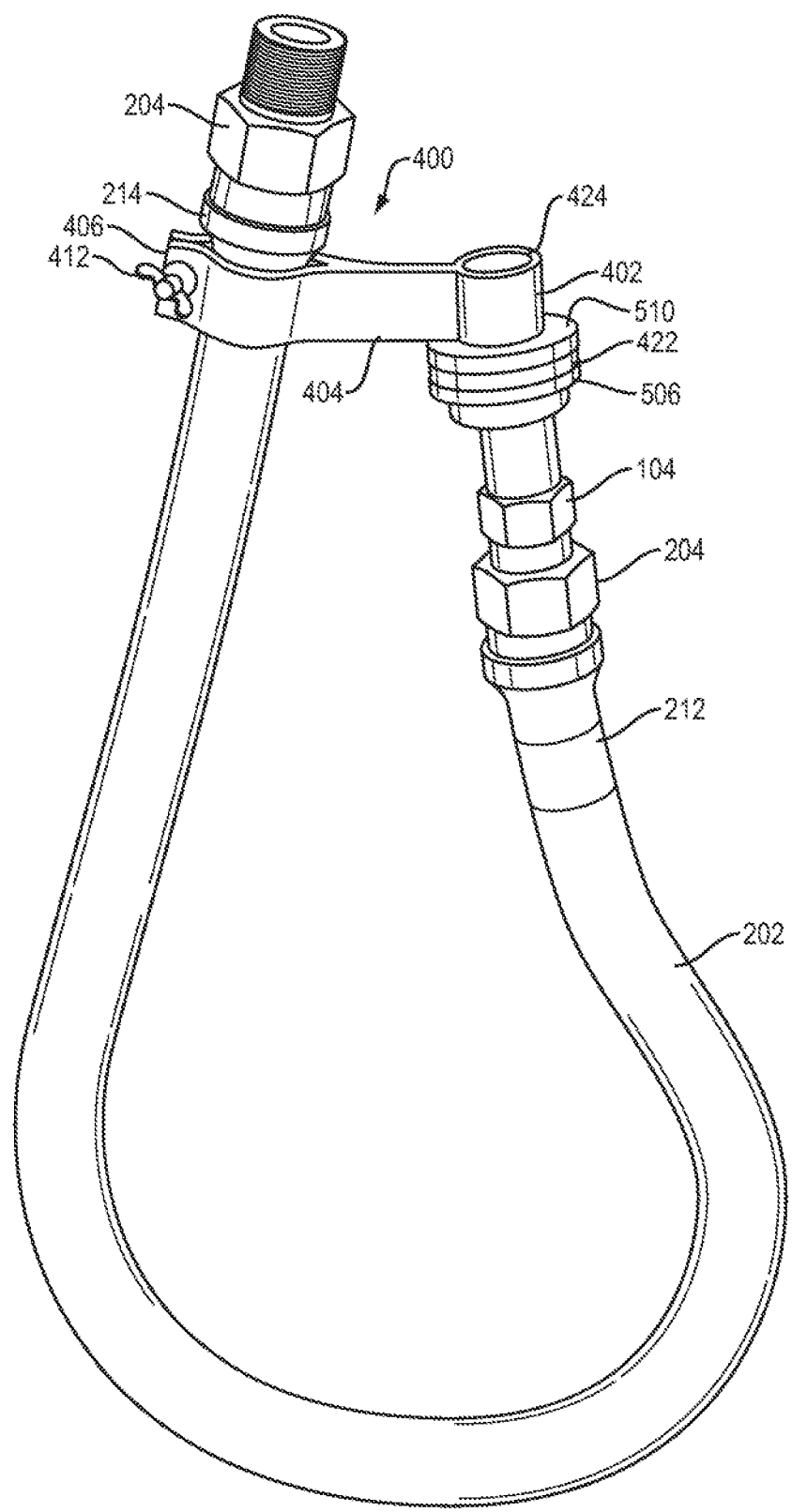
FIG. 6 is an illustration of a hose retaining apparatus installed on a gas hose and engaged with a quick disconnect female coupler according to an aspect of the present disclosure.

FIG. 6 illustrates an implementation of a hose retaining apparatus 400 installed on a gas hose 202 according to an aspect of the present disclosure. The gas hose 202 has threaded connectors 204 on each 212, 214. A first end 212 has a quick disconnect female receptacle 104 attached to the threaded connector 204. A second end 214 of the gas hose 202 is secured within the opposing arms 408, 410 by the fastener 412. The quick disconnect female receptacle 104 of the gas hose 202 is snapped into the double collar portion 422 of the hose end receptacle portion 402. The quick disconnect female receptacle 104 engages the first cylindrical wall 502 (see FIGS. 4B and 5). The second cylindrical wall 506 and disk portion 510 form a skirt that covers and protects the open end of the quick disconnect female coupler 104. As a result, the gas hose 202 can be stored in a coiled manner with the quick disconnect female coupler 104 secure and protected. It is envisioned that the gas hose 202 may be coiled several times depending upon the length of the gas hose 202.

Figure 7:
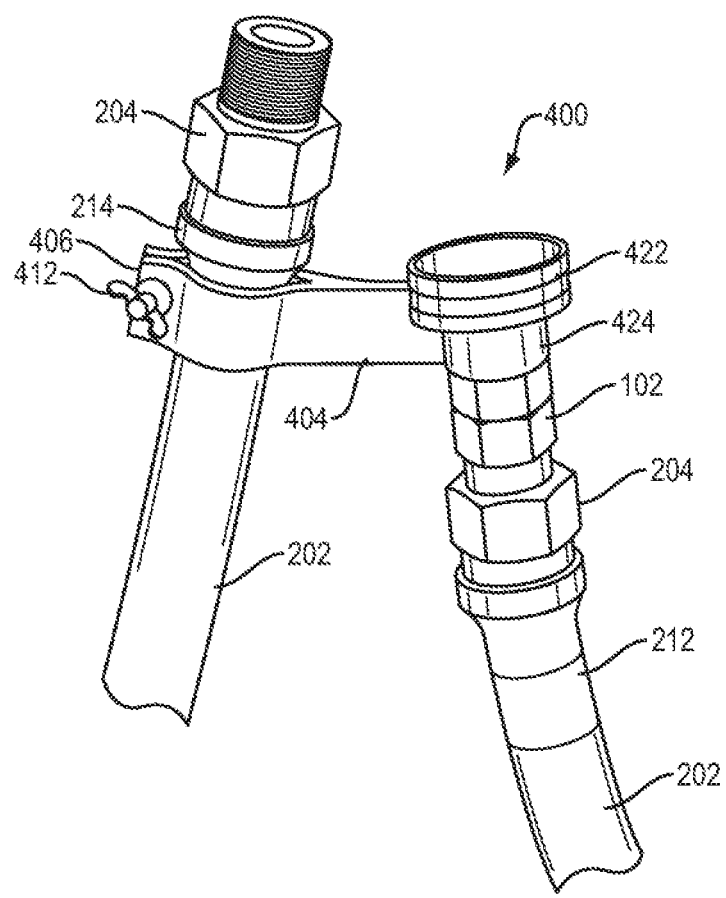
FIG. 7 is an illustration of a hose retaining apparatus installed on a gas hose and engaged with a male quick disconnect nipple according to an aspect of the present disclosure.

FIG. 7 illustrates an implementation of a hose retaining apparatus 400 installed on a gas hose 202 according to another aspect of the present disclosure. A male quick disconnect nipple 102 that is installed on one end 212 of the gas hose 202 is snapped into the single collar portion 424 of the hose end receptacle portion 402. The male quick disconnect nipple 102 engages the third cylindrical wall 514. The other end 214 of the gas hose 202 is secured to the arm portion 406 so that the two ends 212, 214 are closely secured together.

Figure 8:
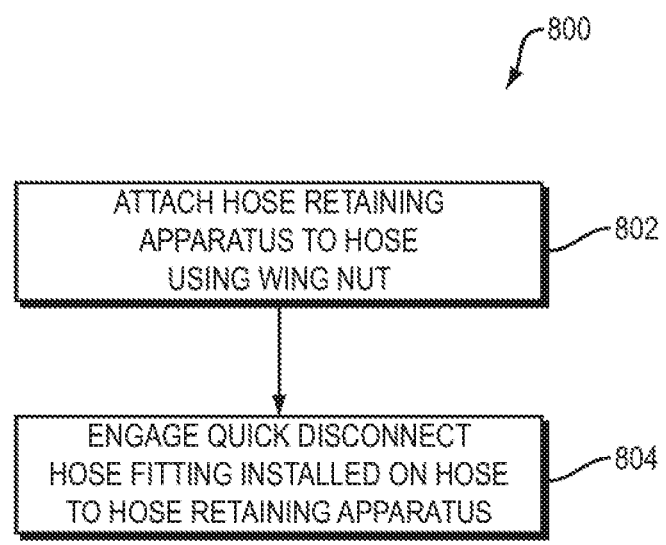
FIG. 8 is a process flow diagram illustrating a method for hanging a hose according to an aspect of the present disclosure.

A method of hanging a hose according to an aspect of the present disclosure is described with reference to FIG. 8. The method 800 includes attaching a hose retaining apparatus 400 to a hose 202 at step 802. The flexible arms 408, 410 are place around the hose 202 at a desired location. The screw and wing nut 412 pass through bores 420 in the flexible arms 408, 410 to selectively fix the apparatus 400 to the hose 202 without tools. At step 804, the method includes disconnecting the quick connect hose fitting, which has a male or female connector. When there is a female connector 104, the female connector 104 is mated to the complimentary double collar portion 422 as shown in FIG. 6. When there is a male nipple 102 that is disconnected, the male nipple 102 is mated to the complimentary single collar portion 424 as shown in FIG. 7. As noted above, the engagement is preferably a snap engagement for secure retention but easy removal without the use of tools by hand.

According to an aspect of the present disclosure, the hose retaining apparatus 400 is made from a flexible tough material that is strong enough to securely retain a quick disconnect female receptacle 104 or a male quick disconnect nipple 102. In an illustrative embodiment, the hose retaining apparatus 400 is injection molded with a material such as Texin 245, which is a flexible, tough Aromatic polyester-based thermoplastic polyurethane (TPU) with approximate Shore D hardness of 45 for injection molding available at covestro.com. The disclosed hose retaining apparatus 400 is strong enough to secure a quick disconnect female receptacle 104 or male quick disconnect nipple 102 installed on an end of a gas hose 202 and flexible enough that the flexible arm portion can bend to accept a gas hose 202 for securing the hose retaining apparatus 400 to the gas hose 202.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., fasteners, arms and the like) shown as distinct for purposes of illustration may be incorporated within other functional elements in a particular implementation. The subject technology may also be integrated into hosing or connectors for handy and secure access. Further, although the subject technology has been described with respect to the field of gas hoses for kitchen appliances, it is envisioned that the subject technology would be equally applicable to other fields and applications, both residential and commercial, such as on any fluid connection or hose.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A hose retaining apparatus, comprising:
    a hose end receptacle portion having a first portion and a second portion;
    a central arm extending from the hose end receptacle portion; and
    a flexible arm portion extending from the central arm opposite the hose end receptacle portion;
    wherein the hose end receptacle portion receives and removably engages with a quick disconnect hose fitting; and
    wherein the flexible arm portion clamps around a hose that is terminated by the quick disconnect hose fitting,
    wherein the second portion of the hose end receptacle portion snap engages with a standard sleeve-lock type quick disconnect female coupler of the quick disconnect hose fitting, and
    wherein the first portion the hose end receptacle portion snap engages with a male quick disconnect nipple of the quick disconnect hose fitting designed to engage the standard sleeve-lock type quick disconnect female coupler.

2. The apparatus of claim 1, wherein the second portion of the hose end receptacle portion comprises a first cylindrical wall having external annular groove for accepting an internal annular rib of the standard sleeve-lock type quick disconnect female coupler.

3. The apparatus of claim 2, wherein the first cylindrical wall comprises an outside profile of a male quick disconnect nipple.

4. The apparatus of claim 3, further comprising a second cylindrical wall coaxially arranged outside of the first cylindrical wall about a central axis of the hose end receptacle portion, the second cylindrical wall forming circumferential skirt portion of the hose end receptacle portion.

5. The apparatus of claim 4, wherein the first cylindrical wall and second cylindrical wall extend from a disk portion, wherein the first cylindrical wall, the second cylindrical wall and the disk portion define an annular groove for receiving and protecting the standard sleeve lock female coupler.

6. The apparatus of claim 5, wherein the disk portion forms a first cover surface for closing the standard sleeve-lock type quick disconnect female coupler.

7. The apparatus of claim 5, wherein the hose end receptacle portion is for snap engagement with the male quick disconnect nipple of the quick disconnect hose fitting.

8. The apparatus of claim 5 wherein the disk portion forms a second cover surface for closing the male quick disconnect nipple of the quick disconnect hose fitting.

9. The apparatus of claim 1, wherein the flexible arm portion comprises a first semi-circular flexible arm and a second semi-circular flexible arm opposite the first flexible arm, the first flexible arm and the second flexible arm configured to clamp around a hose.

10. The apparatus of claim 9, comprising a fastener configured to urge the first flexible arm toward the second flexible arm for selectively fastening the apparatus to the hose.

* * * * *